US007290905B2

(12) United States Patent
Tiesler

(10) Patent No.: US 7,290,905 B2
(45) Date of Patent: Nov. 6, 2007

(54) TRIM PANEL ASSEMBLY HAVING A PIVOTAL LIGHT MECHANISM

(75) Inventor: John M. Tiesler, Harrison Township, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 70 days.

(21) Appl. No.: 11/162,915

(22) Filed: Sep. 28, 2005

(65) Prior Publication Data
US 2007/0070639 A1 Mar. 29, 2007

(51) Int. Cl.
*B60Q 1/00* (2006.01)

(52) U.S. Cl. ....................................... 362/488

(58) Field of Classification Search ................ 362/421, 362/287, 372, 528, 488–490
See application file for complete search history.

(56) References Cited

U.S. PATENT DOCUMENTS

| 4,298,912 A | 11/1981 | Dearth |
| 4,499,528 A * | 2/1985 | Hawlitzki ................... 362/275 |
| 5,070,434 A | 12/1991 | Suman et al. |
| 5,325,275 A | 6/1994 | Liu |
| 5,508,897 A | 4/1996 | Van Order |
| 6,280,042 B1 * | 8/2001 | Wegrzyn et al. .............. 362/20 |
| 6,595,656 B2 * | 7/2003 | Yoda .......................... 362/187 |

* cited by examiner

*Primary Examiner*—Ross N. Gushi
(74) *Attorney, Agent, or Firm*—Brooks Kushman P.C.

(57) ABSTRACT

A trim panel assembly having a first housing, a second housing, and a pivotal light mechanism configured to swivel relative to the first and second housings.

20 Claims, 2 Drawing Sheets

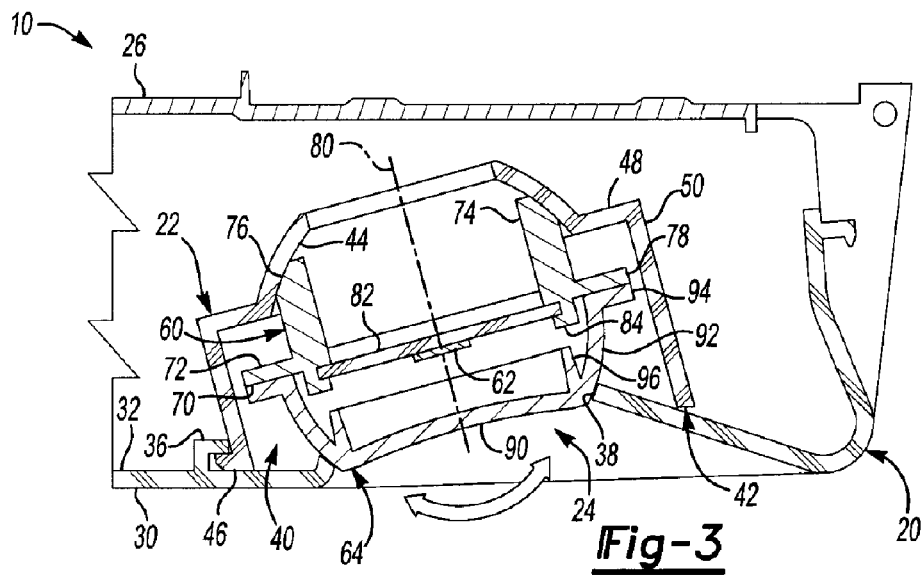
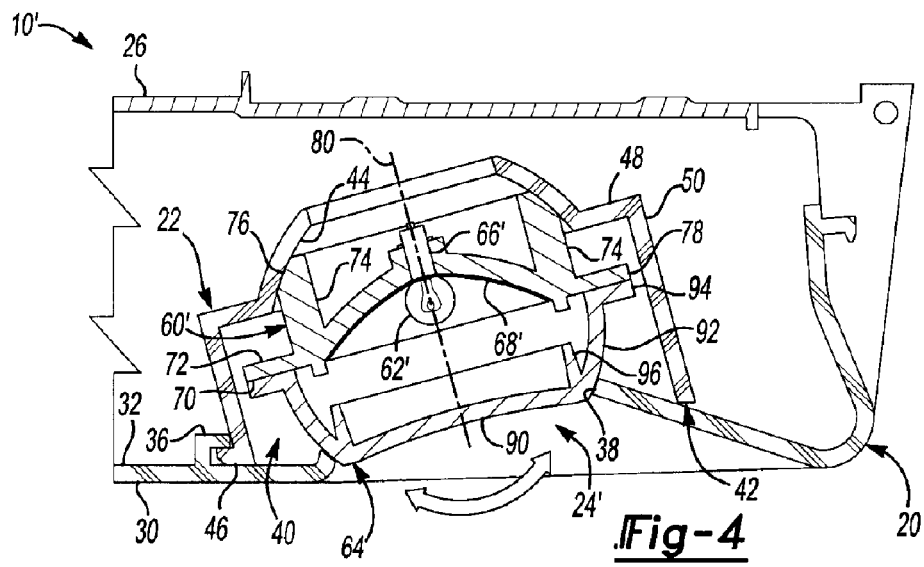
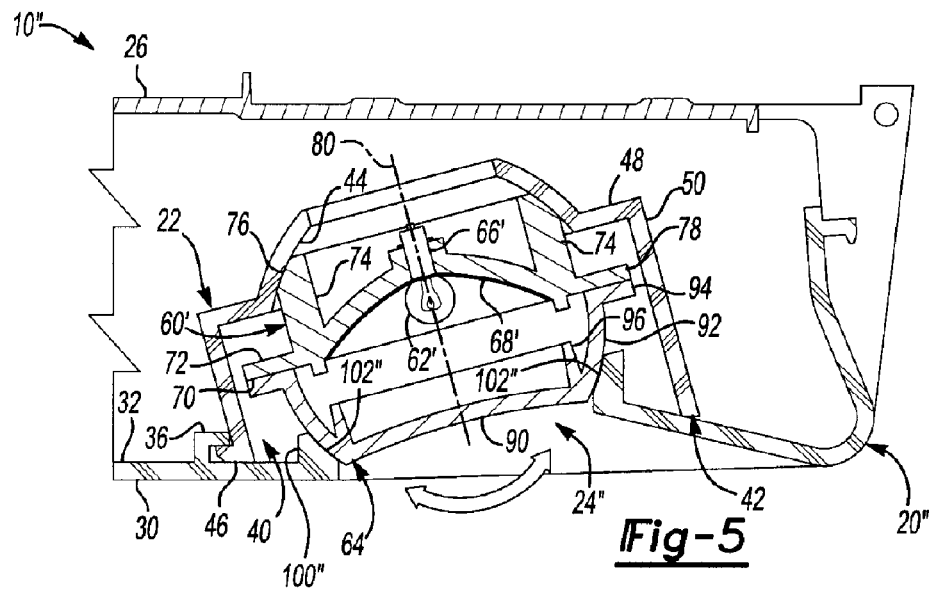

TRIM PANEL ASSEMBLY HAVING A PIVOTAL LIGHT MECHANISM

BACKGROUND OF THE INVENTION

1. Field of the Invention

The present invention relates to a pivotal light mechanism that may be provided with a trim panel assembly for a vehicle.

SUMMARY OF THE INVENTION

In at least one embodiment of the present invention, a trim panel assembly for a vehicle is provided. The trim panel assembly includes a first housing, a second housing, and a pivotal light mechanism that swivels relative to the first and second housings. The first housing has an aperture. The second housing has an open end disposed adjacent to the first housing and an interior curved surface. The pivotal light mechanism includes a back portion, a light source, and a lens portion. The back portion has a curved surface disposed adjacent to the interior curved surface of the second housing. The light source is disposed proximate the back portion. The lens portion is disposed adjacent to the back portion and includes an exterior curved surface disposed adjacent to the first housing.

In at least one other embodiment of the present invention, a trim panel assembly for a vehicle is provided that includes a first housing, a second housing, and a pivotal light mechanism. The first housing has an aperture. The second housing has an open end disposed adjacent to the first housing and an interior curved surface spaced apart from the first housing. The pivotal light mechanism includes a back portion, a light source, and a lens portion. The back portion has a first surface, a second surface disposed opposite the first surface, and a curved surface at least partially spaced apart from the second surface and disposed adjacent to the interior curved surface. The light source is disposed proximate the back portion. The lens portion is disposed adjacent to the first surface of the back portion. The lens portion has an exterior curved surface disposed adjacent to the first housing and a lens disposed adjacent to the exterior curved surface. The curved surface of the back portion slides upon the interior curved surface of the second housing and the exterior curved surface of the lens portion slides upon the front housing to permit the pivotal light mechanism to swivel.

In at least one embodiment of the present invention, a trim panel assembly for a vehicle is provided. The trim panel assembly includes a first housing, a second housing, and a pivotal light mechanism. The first housing has an aperture and a rim surface disposed adjacent to the aperture. The second housing has an open end disposed adjacent to the first housing and an interior curved surface spaced apart from the first housing. The pivotal light mechanism is at least partially disposed between the first and second housings and has a back portion, a light source, and a lens portion. The back portion has a first surface, a second surface disposed opposite the first surface, an opening extending between the first and second surfaces, and a set of protrusions extending from the second surface. Each member of the set of protrusions has a curved protrusion surface disposed adjacent to the interior curved surface. The light source is disposed proximate the aperture. The lens portion is disposed adjacent to the first surface of the back portion. The lens portion has a lens and an exterior curved surface disposed adjacent to the rim surface. The curved protrusion surfaces slide upon the interior curved surface and the exterior curved surface slides upon the rim surface when the pivotal light mechanism moves relative to the first and second housings.

BRIEF DESCRIPTION OF THE DRAWINGS

FIG. 3 is a fragmentary section view of a portion of the trim panel assembly shown in FIG. 1 having a first embodiment of the pivotal light mechanism.

FIG. 4 is a fragmentary section view of a trim panel assembly having a second embodiment of the pivotal light mechanism.

FIG. 5 is a fragmentary section view of a trim panel assembly having a third embodiment of the pivotal light mechanism.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
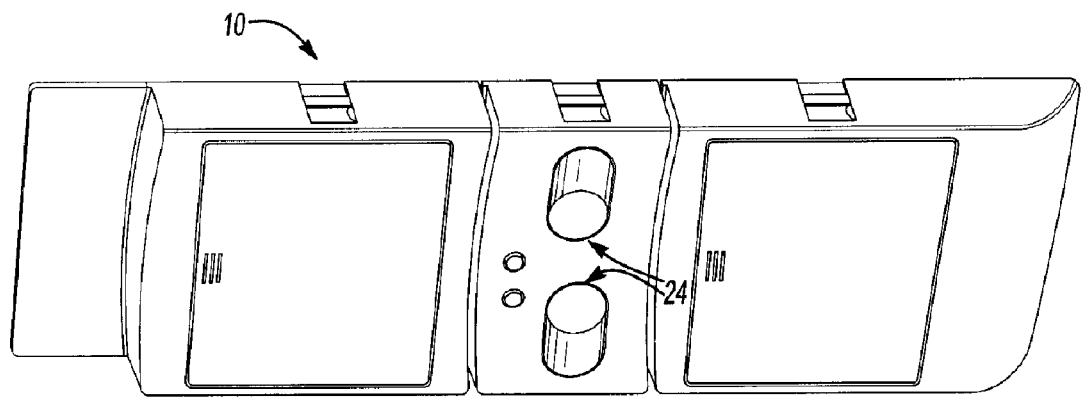
FIG. 1 is a perspective view of an exemplary trim panel assembly having a pivotal light mechanism.

Referring to FIG. 1, an exemplary trim panel assembly 10 is shown. The trim panel assembly 10 may be disposed in the passenger compartment of a vehicle and may have any suitable configuration. The trim panel assembly 10 may be associated with any suitable vehicle surface or component. For example, the trim panel assembly 10 may be part of a console unit, door module, vehicle seat, instrument panel, or any other suitable interior trim surface. In the embodiment shown, the trim panel assembly 10 is configured as a console unit that may include one or more modules that may be fixedly or moveably positioned. For instance, one or more modules may be disposed on a floor-mounted or headliner-mounted track that permits one or more modules can be moved and secured to a desired position.

Figure 2:
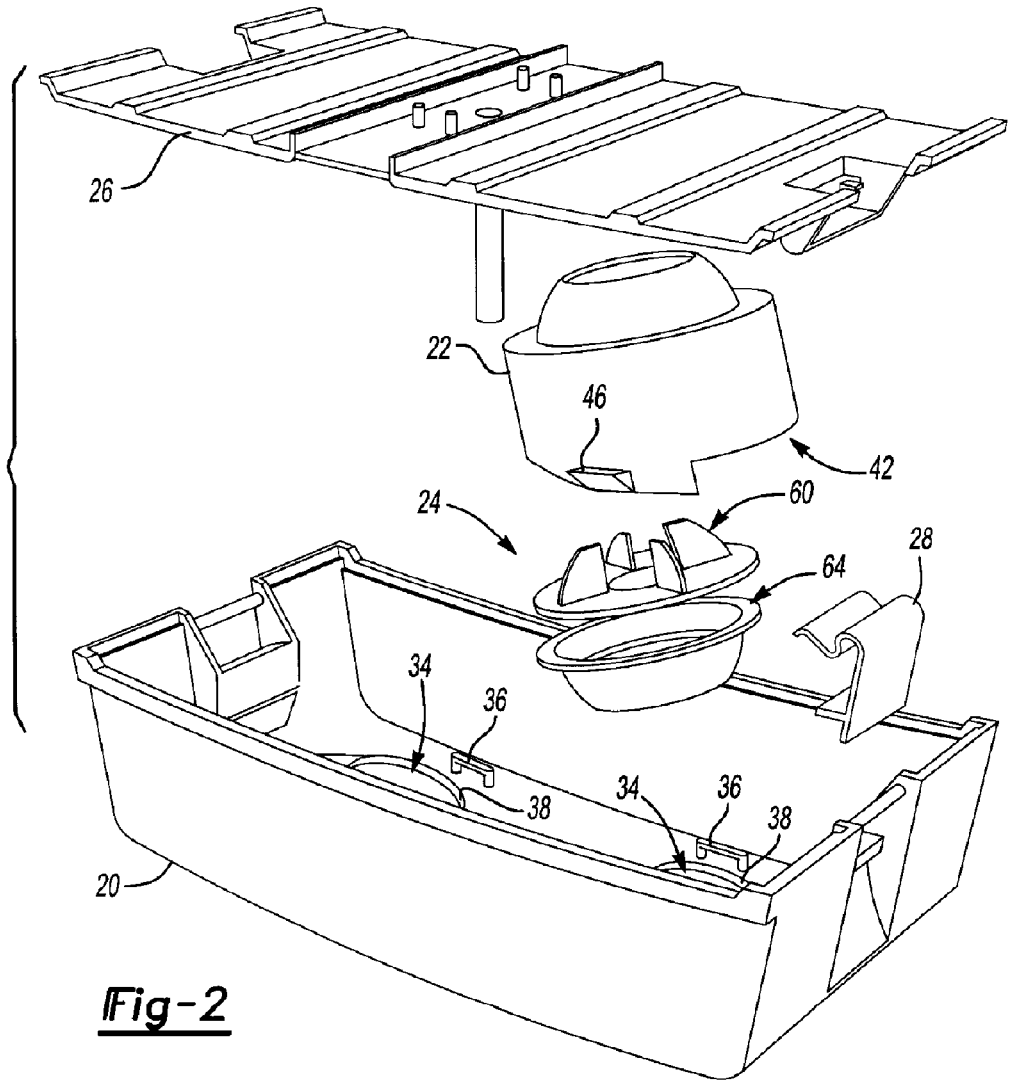
FIG. 2 is an exploded perspective view of a portion of the trim panel assembly and pivotal light mechanism of FIG. 1.

Referring to FIGS. 2 and 3, a portion of one embodiment the trim panel assembly 10 is shown in more detail. The trim panel assembly 10 may include a first housing 20, a second housing 22, and one or more pivotal light mechanisms 24. In addition, the trim panel assembly 10 may include a mounting plate 26 that receives the first housing 20 and one or more latches 28 that may be disengaged to facilitate positioning or removal of the trim panel assembly 10 or a portion thereof.

The first housing 20 may have any suitable configuration. In the embodiment shown, the first housing 20 includes a first surface 30, a second surface 32 disposed opposite the first surface 30, and an aperture 34 that extends between the first and second surfaces 30,32. In addition, the first housing 20 may also include one or more retaining features 36. The first housing 20 may be made of any suitable material, such as a polymeric material like polypropylene.

The aperture 34 may be associated with at least one pivotal light mechanism 24 and may permit light from at least one pivotal light mechanism 24 to enter the vehicle passenger compartment. The aperture 34 may be at least partially defined by a rim surface 38. In the embodiment, shown, the rim surface 38 extends between the first and second surfaces 30,32 and is curved to facilitate movement of the pivotal light mechanism 24. Alternatively, the rim surface 38 may have any other suitable configuration that facilitates movement or swiveling of the pivotal light mechanism 24. For instance, the rim surface 38 may be generally linear in one or more embodiments of the present invention.

The one or more retaining features 36 may be adapted to engage and secure the second housing 22 to the first housing 20. Moreover, the retaining features 36 may be configured to permit the second housing 22 to be selectively removed from the first housing 20. The retaining features 36 may have any suitable configuration, such as male, female, or combinations thereof. Alternatively, the retaining features 36 may be omitted in one or more embodiments of the present invention.

The second housing 22 may have any suitable configuration. The second housing 22 may at least partially define a cavity 40 that receives the pivotal light mechanism 24. In addition, the second housing 22 may include an open end 42, an interior curved surface 44, and one or more retaining features 46. The second housing 22 may be made of any suitable material, such as a polymeric material like acrylonitrile butadiene styrene (ABS) or nylon. Moreover, a material may be selected to provide desirable friction or lubricity characteristics that facilitate swiveling of the pivotal light mechanism 24 and inhibit squeaks or other undesirable noises.

The open end 42 may face toward the first housing 20 and may be generally disposed around the aperture 34. As is best shown in FIG. 3, the open end 42 may be disposed adjacent to the second surface 32 and may be spaced apart from the aperture 34.

The interior curved surface 44 may extend around at least a portion of the second housing 22. As shown in FIG. 3, the interior curved surface 44 may be spaced apart from the first housing 20 and may be disposed adjacent to an intermediate wall 48 that in turn is disposed adjacent to a side wall 50 of the second housing 22.

The retaining features 46 may be adapted to engage an associated retaining feature 36 on the first housing 20. Alternatively, the first and second housings 20,22 may be attached in any suitable manner, such as with an adhesive, fasteners, vibration welding, heat staking, or sonic welding in one or more embodiments of the present invention.

The one or more pivotal light mechanisms 24 may be at least partially disposed between the first and second housings 20,22. Moreover, each pivotal light mechanism 24 may move or swivel relative to the first and second housings 20,22 to direct light in a desired direction. The pivotal light mechanism 24 may include a back portion 60, a light source 62, and a lens portion 64. For clarity, one pivotal light mechanism 24 is shown in FIGS. 2-5.

The back portion 60 may have any suitable configuration. In the embodiment shown in FIG. 3, the back portion includes a first surface 70 and a second surface 72. The first surface 70 may generally face toward the first housing 20. The second surface 72 may be disposed opposite the first surface 70 and may include one or more protrusions 74, such as ribs that extend from the second surface 72. The one or more protrusions 74 may include at least one curved surface 76. The curved surface 76 may engage the interior curved surface 44 to facilitate positioning of the pivotal light assembly 24 as discussed in more detail below. The curved surface 76 may be spaced apart from the second surface 72 as shown in FIG. 3 or may extend from or be formed on the second surface 72 in one or more embodiments of the present invention. The back portion 60 may be made of any suitable material, such as a polymeric material like ABS or nylon that provides desirable friction or lubricity characteristics to facilitate swiveling of the pivotal light mechanism 24 and inhibit squeaks or other undesirable noises.

The back portion 60 may also include a flange section 78. The flange section 78 may extend away from and generally perpendicular to a center axis 80 of the pivotal light mechanism 24. The flange section 78 may limit the range of movement of the pivotal light mechanism 24. More specifically, the flange section 78 may inhibit movement of the pivotal light mechanism 24 when the flange section 78 contacts the second housing 22.

The light source 62 may be of any suitable type, such as an incandescent bulb or light emitting diode (LED). The light source 62 may be disposed proximate or adjacent to the back portion 60 in various embodiments of the present invention. For example, in the embodiment shown in FIG. 3, the light source 62 is configured as an LED and is disposed on a substrate 82, such as a circuit board, that is disposed adjacent to the back portion 60 and secured to the back portion 60 with one or more engagement features 84. Of course, the present invention also contemplates embodiments in which an LED is disposed adjacent to the back portion 60 rather than on a substrate. In addition, the embodiments shown in FIGS. 3-5 are not limited to a specific type of light source. For example, the embodiment of FIG. 3 may be provided with a bulb rather than an LED while the embodiments shown in FIGS. 4 and 5 may be provided with a LED rather than a bulb.

A lens portion 64 may be disposed adjacent to the back portion 60 and may have any suitable configuration. For example, the lens portion 64 may include a lens 90 and an exterior curved surface 92. In addition, the lens portion 64 may include a flange section 94 and a ring feature 96 for directing light from the light source 62 toward the lens 90.

The lens 90 may be configured to facilitate light transmission. In the embodiment shown, the lens 90 is disposed adjacent to exterior curved surface 92 and has a generally concave configuration that is curved or indented toward the back portion 60 to facilitate manual positioning of the pivotal light mechanism 24 as will be described in more detail below. The lens 90 may be made of any suitable material, such as a semi-transparent or transparent material like polycarbonate.

The exterior curved surface 92 may extend at least partially around the lens portion 64. The exterior curved surface 92 may be adapted to engage the first housing 20 to facilitate swiveling of the pivotal light mechanism 24. In the embodiments shown in FIGS. 3 and 4, the exterior curved surface 92 is configured to engage the rim surface 38. Alternatively, the exterior curved surface 92 may be configured to engage a set of protrusions or ribs that extend from the first housing 20 in one embodiment of the present invention.

The flange section 94 may extend away from and generally perpendicular to the center axis 80 of the pivotal light mechanism 24. The flange section 94 may limit the range of movement of the pivotal light mechanism 24. More specifically, the flange section 94 may inhibit movement of the pivotal light mechanism 24 when the flange section 94 contacts the first housing 20.

The ring feature 96 may direct light from the light source 62 toward the lens 90 and may have any suitable configuration. For example, the ring feature 96 may extend from an interior surface of the lens portion 64 toward the back portion 60. In addition, the ring feature 96 may be spaced apart from the lens 90 or disposed adjacent to the lens 90. The ring feature 96 may be made of the same or different material as the lens 96 to provide desirable light transmission characteristics. Moreover, the ring feature 96 may be tinted or coated to reflect light or inhibit light transmission in one or more embodiments of the present invention.

The back portion 60 and lens portion 64 may be assembled to each other in any suitable manner. For example, the back and lens portions 60,64 may be assembled using an adhesive, fasteners, retaining features, vibration welding, sonic welding, or heat staking.

Referring to FIG. 4, another embodiment of a trim panel assembly 10' and a pivotal light assembly 24' is shown. In this embodiment, the back portion 60' of the pivotal light mechanism 24' includes a socket or opening 66' for receiving the light source 62'. The back portion 60' may also include a concave portion that helps direct light from the light source 62' toward the lens portion 64. In addition, a reflective coating 68' may be provided on the concave portion to help reflect light toward the lens 90.

Referring to FIG. 5, another embodiment of a trim panel assembly 10" and a pivotal light mechanism 24" is shown. In this embodiment, the first housing 20" includes at least one protrusion 100" that extends from the second surface 32. The protrusion 100" may include a curved protrusion surface 102" that is adapted to engage the exterior curved surface 92 of the lens portion 64 to facilitate movement of the pivotal light mechanism 24". The protrusion 100" may have any suitable configuration. For example, the protrusion may extend around the aperture 34 or may be configured as one or more ribs that may be spared apart from each other in one or more embodiments of the present invention.

The pivotal light mechanism may be moved to a desired position when sufficient force is applied. For example, the pivotal light mechanism may be manually positioned by exerting sufficient force on the lens portion to overcome the friction between the pivotal light mechanism and the first and/or second housings. In at least one embodiment, the lens may have a concave or textured surface that helps makes it easier to engage and position the pivotal light mechanism. Moreover, the pivotal light mechanism may remain in a desired position when sufficient force is not exerted due to the friction between the pivotal light mechanism and first and/or second housings. As such, the present invention allows the pivotal light mechanism to direct light in various directions, yet remains in a desired orientation when the pivotal light mechanism is not actuated.

The present invention also allows a trim panel assembly to be provided with a lens that appears to be generally coextensive with an exterior housing surface, thereby providing a desirable aesthetic appearance.

While embodiments of the invention have been illustrated and described, it is not intended that these embodiments illustrate and described all possible forms of the invention. Rather, the words used in the specification are words of description rather than limitation, and it is understood that various changes may be made without departing from the spirit and scope of the invention.

What is claimed is:

1. A trim panel assembly for a vehicle, the trim panel assembly comprising:
   a first housing having an aperture;
   a second housing having an interior curved surface and an open end disposed adjacent to the first housing; and
   a pivotal light mechanism including:
      a back portion having a curved surface disposed adjacent to the interior curved surface;
      a light source disposed proximate the back portion; and
      a lens portion disposed adjacent to the back portion, the lens portion having an exterior curved surface disposed adjacent to the first housing and a flange section that extends away from a center axis of the pivotal light mechanism, the flange section being configured to contact the first housing to inhibit movement of the pivotal light mechanism;
   wherein the pivotal light mechanism swivels relative to the first and second housings when sufficient force is applied.

2. The trim panel assembly of claim 1 wherein the back portion further comprises a first surface, a second surface disposed opposite the first surface, an opening extending between the first and second surfaces, and a reflective layer disposed on the first surface adjacent to the aperture, wherein the light source at least partially extends through the opening.

3. The trim panel assembly of claim 1 wherein the flange section extends generally perpendicular to the center axis of the pivotal light mechanism.

4. The trim panel assembly of claim 1 wherein the back portion further comprises a first surface, a second surface disposed opposite the first surface, and a set of protrusions extending from the second surface, each member of the set of protrusions having a curved protrusion surface disposed adjacent to the interior curved surface.

5. The trim panel assembly of claim 1 wherein the second housing is disposed adjacent to the first housing.

6. The trim panel assembly of claim 1 wherein the first housing further comprises a rim surface disposed adjacent to the aperture, wherein the exterior curved surface is moveably disposed on the rim surface.

7. The trim panel assembly of claim 1 wherein the first housing further comprises a plurality of housing protrusions extending from the first housing toward the lens portion, each member of the plurality of housing protrusions having a curved housing protrusion surface that contacts the exterior curved surface.

8. The trim panel assembly of claim 1 wherein the lens portion further comprises a lens disposed adjacent to the exterior curved surface, the lens having an interior surface, and a ring feature extending from the interior surface toward the back portion for reflecting light from the light source toward the lens.

9. The trim panel assembly of claim 8 wherein the ring feature is opaque.

10. The trim panel assembly of claim 8 wherein the lens further comprises a concave exterior surface disposed opposite the interior surface, wherein the concave exterior surface facilitates manual positioning of the pivotal light mechanism.

11. A trim panel assembly for a vehicle, the trim panel assembly comprising:
   a first housing having an aperture;
   a second housing fixedly positioned relative to the first housing, the second housing having an open end disposed adjacent to the first housing and an interior curved surface spaced apart from the first housing; and
   a pivotal light mechanism including:
      a back portion having a first surface, a second surface disposed opposite the first surface, and a curved surface at least partially spaced apart from the second surface and disposed adjacent to the interior curved surface;

a light source disposed proximate the back portion; and a lens portion disposed adjacent to the first surface of the back portion, the lens portion having an exterior curved surface disposed adjacent to the first housing, a lens disposed adjacent to the exterior curved surface, an exterior surface facing the aperture, an interior surface disposed opposite the exterior surface, and a ring feature extending from the interior surface toward the back portion for reflecting light from the light source toward the lens;

wherein the curved surface of the back portion slides upon the interior curved surface of the second housing and the exterior curved surface of the lens portion slides upon the front housing to permit the pivotal light mechanism to swivel when sufficient force is applied.

12. The trim panel assembly of claim 11 wherein the first housing further comprises a set of housing protrusions disposed adjacent to the aperture, each member of the set of housing protrusions having a curved housing protrusion surface, wherein the exterior curved surface slides upon at least one of the curved housing protrusion surfaces when the pivotal light mechanism swivels.

13. The trim panel assembly of claim 11 wherein the light source is a light emitting diode disposed on a substrate that is disposed adjacent to the back portion.

14. The trim panel assembly of claim 11 wherein the back portion and lens portion each have a flange section that extends generally perpendicular to a center axis of the pivotal light mechanism, the flange section on the back portion being configured to contact the second housing and the flange section on the lens portion being configured to contact the first housing to inhibit movement of the pivotal light mechanism.

15. The trim panel assembly of claim 11 wherein at least a portion of the pivotal light mechanism is configured to contact the first housing to inhibit movement.

16. A trim panel assembly for a vehicle, the trim panel assembly comprising:

a first housing having an aperture and a rim surface disposed adjacent to the aperture;

a second housing having an open end disposed adjacent to the first housing and an interior curved surface spaced apart from the first housing; and a pivotal light mechanism at least partially disposed between the first and second housings, the pivotal light mechanism including:

a back portion having a first surface, a second surface disposed opposite the first surface, an opening extending between the first and second surfaces, and a set of protrusions extending from the second surface, each member of the set of protrusions having a curved protrusion surface disposed adjacent to the interior curved surface;

a light source disposed proximate the aperture; and a lens portion disposed adjacent to the first surface of the back portion, the lens portion having a lens and an exterior curved surface disposed adjacent to the rim surface;

wherein the curved protrusion surfaces slide upon the interior curved surface and the exterior curved surface slides upon the rim surface when the pivotal light mechanism moves relative to the first and second housings when sufficient force is applied to the lens portion and wherein the pivotal light mechanism does not move when sufficient force is not applied to the lens portion.

17. The trim panel assembly of claim 16 wherein the lens portion further comprises a flange section that extends away from a center axis of the pivotal light mechanism, the flange section being configured to contact the first housing to inhibit movement of the pivotal light mechanism.

18. The trim panel assembly of claim 16 wherein the back portion includes a flange section that extends away from a center axis of the pivotal light mechanism, the flange section being configured to contact the second housing to inhibit movement of the pivotal light mechanism.

19. The trim panel assembly of claim 16 wherein the back portion includes a first flange section and the lens portion includes a second flange section disposed adjacent to the first flange section.

20. The trim panel assembly of claim 16 wherein the lens portion further comprises a ring feature for reflecting light from the light source toward the lens, the ring feature being disposed adjacent to the lens and extending toward the back portion.

* * * * *